United States Patent
Sato et al.

(10) Patent No.: US 7,626,136 B2
(45) Date of Patent: Dec. 1, 2009

(54) POWDER METAL CLADDING NOZZLE

(75) Inventors: Akio Sato, Toyota (JP); Yoshinori Ishikawa, Okazaki (JP); Steffen Nowotny, Radebeul (DE); Siegfried Scharek, Freital (DE)

(73) Assignees: Toyota Jidosha Kabushiki Kaisha, Toyota (JP); Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 652 days.

(21) Appl. No.: 10/550,024

(22) PCT Filed: Jan. 4, 2005

(86) PCT No.: PCT/IB2005/000002

§ 371 (c)(1),
(2), (4) Date: Sep. 23, 2005

(87) PCT Pub. No.: WO2005/084875

PCT Pub. Date: Sep. 15, 2005

(65) Prior Publication Data

US 2006/0266740 A1 Nov. 30, 2006

(30) Foreign Application Priority Data

Feb. 3, 2004 (JP) ............................. 2004-026779

(51) Int. Cl.
*B23K 26/14* (2006.01)
*B23K 26/34* (2006.01)

(52) U.S. Cl. ........................... 219/121.63; 219/121.84; 118/641; 118/308; 118/315

(58) Field of Classification Search ............ 219/121.63, 219/121.64, 121.84; 118/641, 308, 315
See application file for complete search history.

(56) References Cited

U.S. PATENT DOCUMENTS

| 3,598,129 | A | * | 8/1971 | Itoda | 453/62 |
| 3,873,024 | A | * | 3/1975 | Probst et al. | 239/704 |
| 4,125,754 | A | * | 11/1978 | Wasserman et al. | 219/121.47 |
| 4,672,171 | A | * | 6/1987 | Cusimano et al. | 219/121.48 |
| 4,678,120 | A | * | 7/1987 | Matsuo | 239/75 |

(Continued)

FOREIGN PATENT DOCUMENTS

JP 402258186 A * 10/1990

(Continued)

*Primary Examiner*—Samuel M Heinrich
(74) *Attorney, Agent, or Firm*—Oliff & Berridge, PLC

(57) ABSTRACT

A powder metal cladding nozzle which is coaxially attached to a laser processing head that irradiates a process portion (W) with a laser beam (L) and that discharges powder metal (P) to a laser beam irradiation portion in the process portion (W). The powder metal cladding nozzle includes a body portion (2) that has a ring-shaped powder metal holding space (7) in which the powder metal (P) is held; and a nozzle portion (3) that is connected to the body portion (2) and that has plural discharge passages (18) which are communicated with the powder metal holding space (7) and which open at an outlet (19) for discharging the powder metal (P). The powder metal holding space (7) is formed in the body portion (2) and is divided into plural powder metal holding regions corresponding to plural supply passages (10) that open into the powder metal holding space (7) and that supply the powder metal (P) to the powder metal holding space (7).

8 Claims, 12 Drawing Sheets

U.S. PATENT DOCUMENTS

| | | | | |
|---|---|---|---|---|
| 4,724,299 | A * | 2/1988 | Hammeke | 219/121.6 |
| 5,043,548 | A * | 8/1991 | Whitney et al. | 219/121.47 |
| 5,205,469 | A * | 4/1993 | Capitanescu | 228/225 |
| 5,213,247 | A * | 5/1993 | Gschwend et al. | 227/10 |
| 5,321,228 | A * | 6/1994 | Krause et al. | 219/121.84 |
| 5,449,536 | A * | 9/1995 | Funkhouser et al. | 427/597 |
| 5,477,026 | A | 12/1995 | Buongiorno | |
| 5,609,781 | A * | 3/1997 | Kaga et al. | 219/121.84 |
| 5,837,960 | A * | 11/1998 | Lewis et al. | 219/121.63 |
| 5,855,149 | A * | 1/1999 | Islam et al. | 76/107.8 |
| 6,316,744 | B1 | 11/2001 | Nowotny et al. | |
| 6,534,745 | B1 * | 3/2003 | Lowney | 219/121.84 |
| 6,649,858 | B2 * | 11/2003 | Wakeman | 219/73.2 |
| 6,998,568 | B2 * | 2/2006 | Brehm et al. | 219/121.62 |
| 7,259,353 | B2 * | 8/2007 | Guo | 219/121.63 |
| 7,509,240 | B2 * | 3/2009 | Das et al. | 703/1 |
| 2005/0056628 | A1 * | 3/2005 | Hu | 219/121.84 |
| 2005/0142021 | A1 * | 6/2005 | Aimone et al. | 419/19 |
| 2006/0235562 | A1 * | 10/2006 | Knoppers et al. | 700/119 |

FOREIGN PATENT DOCUMENTS

| | | |
|---|---|---|
| JP | A-05-084589 | 4/1993 |
| JP | 94061523 B2 * | 8/1994 |
| JP | 407060461 A * | 3/1995 |
| JP | U-07-15180 | 3/1995 |
| JP | A 10-501463 | 2/1998 |
| JP | A-11-000775 | 1/1999 |
| JP | 2891378 B2 * | 5/1999 |

* cited by examiner

F I G . 15
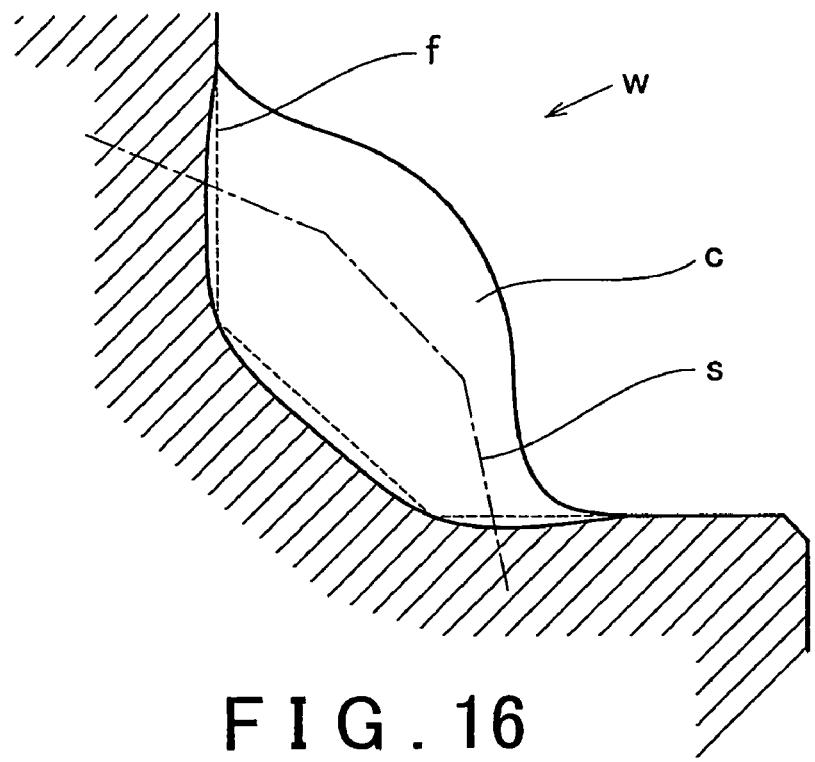
F I G . 16
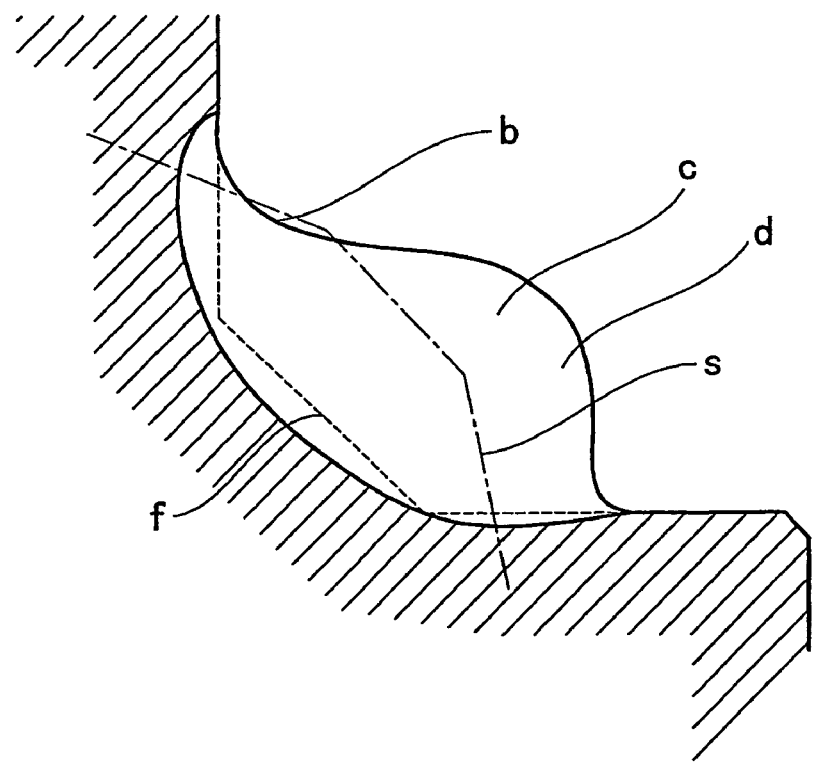

POWDER METAL CLADDING NOZZLE

FIELD OF THE INVENTION

The invention relates to a powder metal cladding nozzle which discharges powder metal to a process portion that is irradiated with a laser beam, and which performs cladding on the process portion.

BACKGROUND OF THE INVENTION

As a powder metal cladding nozzle, a powder metal cladding nozzle using a laser, shown in FIG. 19, is known (refer to Published Japanese Translation of PCT application, JP-T-10-501463).

A powder metal cladding nozzle 100 shown in FIG. 19 is formed by screwing a rear unit 102 into a front unit 101. The rear unit 102 has a beam passage 103 which extends backward (i.e., upward in FIG. 19) from the front unit 101, and the front unit 101 has an opening 104 at the end of the beam passage 103 such that the axis of the beam passage 103 agrees with the center of the opening 104. A cone-shaped passage 107 is formed between an outer surface 105 of the rear unit 102 fitted in the front unit 101 and an inner surface 106 of the front unit 101. A powder metal supply passage 108 opens into an upper portion of the cone-shaped passage 107.

In the thus formed powder metal cladding nozzle, powder metal is supplied from the supply passage 108 to the passage 107, and the supplied powder metal moves along the passage 107 and is discharged to a process portion W from the opening 104. Also, a beam generated by a laser generator 109 is converged by an optical system 110 such as a lens. The converged beam passes through the beam passage 103, and is irradiated to the process portion W from the opening 104. The laser beam melts the discharged powder metal. A cladding layer can be thus formed on the process portion by using the powder metal cladding nozzle shown in FIG. 19.

With the above-mentioned powder metal cladding nozzle, a good cladding layer can be obtained when cladding is performed while the axis of the nozzle is maintained in the vertical direction. However, when the nozzle is used while the axis of the nozzle is tilted with respect to the vertical direction, the volume of powder metal on the lower side and the volume of powder metal on the upper side become unbalanced in the passage 107 of the nozzle 100 due to gravity. Accordingly, the powder metal cannot be discharged uniformly from the opening 104, which causes a problem that a good cladding layer cannot be obtained.

DISCLOSURE OF THE INVENTION

It is an object of the invention to provide a powder metal cladding nozzle which is coaxially attached to a laser processing head that irradiates a process portion with a laser beam and that discharges powder metal to a laser beam irradiation portion in the process portion, and which can discharge the powder metal from an outlet formed at an end of the nozzle such that an amount of powder metal discharged from the outlet is uniform at any portion of the outlet, even when the axis of the nozzle is tilted with respect to the vertical direction.

An aspect of the invention relates to a powder metal cladding nozzle which is coaxially attached to a laser processing head that irradiates a process portion with a laser beam and that discharges powder metal to a laser beam irradiation portion in the process portion. The powder metal cladding nozzle includes a body portion that has a ring-shaped powder metal holding space in which the powder metal is held; and a nozzle portion that is connected to the body portion and that has plural discharge passages which are communicated with the powder metal holding space and which open at an outlet for discharging the powder metal. The powder metal holding space is formed in the body portion and is divided into plural powder metal holding regions corresponding to plural supply passages that open into the powder metal holding space and that supply the powder metal.

With the above-mentioned structure, the powder metal holding space is divided into the plural powder metal holding regions corresponding to the plural supply passages for supplying the powder metal, and the nozzle portion has the powder metal discharge passages which open at the outlet formed at the end of the nozzle portion. It is therefore possible to guide the powder metal held in the powder metal holding regions to the corresponding portions of the outlet, and discharge the powder metal from the outlet such that an amount of powder metal discharged from the outlet is uniform at any portion of the outlet.

The powder metal holding space is formed by fitting an inner side member in an outer side member of the body portion. The inner side member may include an inner side body portion and dividing portions for dividing the powder metal holding space into plural powder metal holding regions.

The powder metal holding space is formed by fitting the inner side member in the outer side member of the body portion. Therefore, when the inner side member includes the dividing portions, the powder metal holding space can be divided into plural powder metal holding regions corresponding to the plural supply passages.

The inner side body portion may be formed integrally with the dividing portions. Also, the dividing portions may be dividing members which are attachable to/detachable from the inner side body portion.

When the dividing portions are the dividing members which are attachable to/detachable from the inner side member, the powder metal holding space can be appropriately divided into the powder metal holding regions each of which has an intended size. It is therefore possible to adjust a shape of a cladding layer by adjusting the widths of the powder metal holding regions based on a tilt angle when cladding is performed with a laser processing head tilted with respect to the vertical direction.

Also, the discharge passages may be formed by fitting an inner side nozzle member, which has plural groove portions in an outer surface thereof, to an outer side nozzle member of the nozzle portion.

By using the groove portions formed in the outer surface of the inner side nozzle member as the powder metal discharge passages, it is possible to easily form and maintain the discharge passages.

The inner side nozzle member may be fitted in the outer side nozzle member such that the end of the inner side nozzle member is retracted with respect to the end of the outer side nozzle member by a predetermined amount in the axial direction of the nozzle portion.

By fitting the inner side nozzle member in the outer side nozzle member such that the end of the inner side nozzle member is retracted with respect to the end of the outer side nozzle member by the predetermined amount in the axial direction of the nozzle portion, the area in the process portion, in which the powder metal is discharged in a concentrated manner, is increased. It is therefore possible to increase powder efficiency of the powder metal.

Also, the supply passage may be formed in a central portion of an arc of the arc-shaped powder metal holding region such that the powder metal is supplied toward the center of the arc.

By forming the supply passage toward the center of the arc of the powder metal holding region and forming the supply passage in the central portion of the arc, the powder metal is supplied so as to be dispersed from side to side in the powder metal holding region. It is therefore possible to discharge the powder metal from the outlet such that an amount of powder metal discharged from the outlet is further uniform at any portion of the outlet.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 15 is a view showing a cross section of a cladding layer formed by using a powder metal cladding nozzle M;

FIG. 16 is a view showing a cross section of a cladding layer formed by using a powder metal cladding nozzle N;

DETAILED DESCRIPTION OF THE PREFERRED EMBODIMENTS

Figure 1:
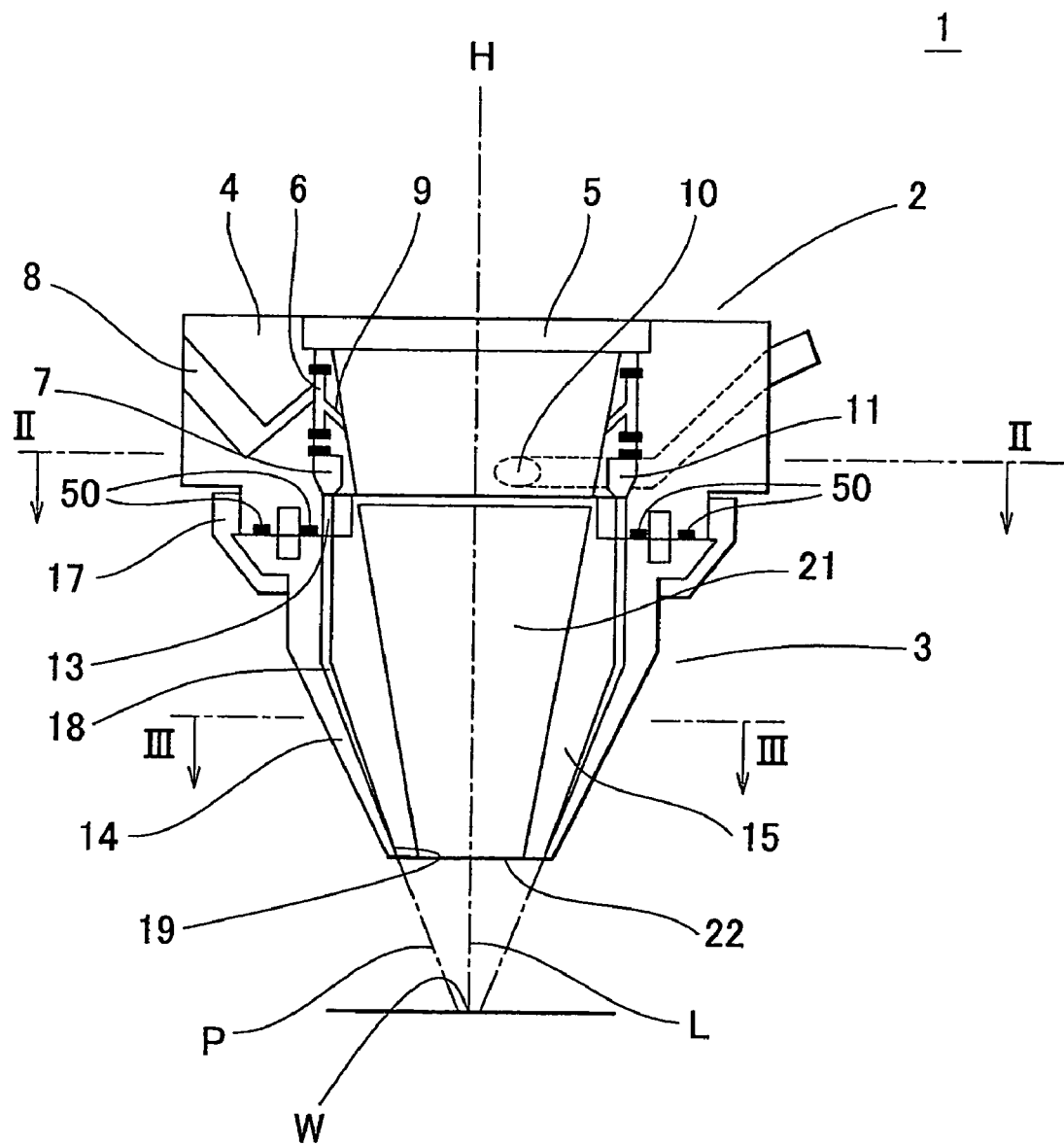
FIG. 1 is a cross sectional view schematically showing a structure of a powder metal cladding nozzle according to an embodiment the invention.
Figure 2:
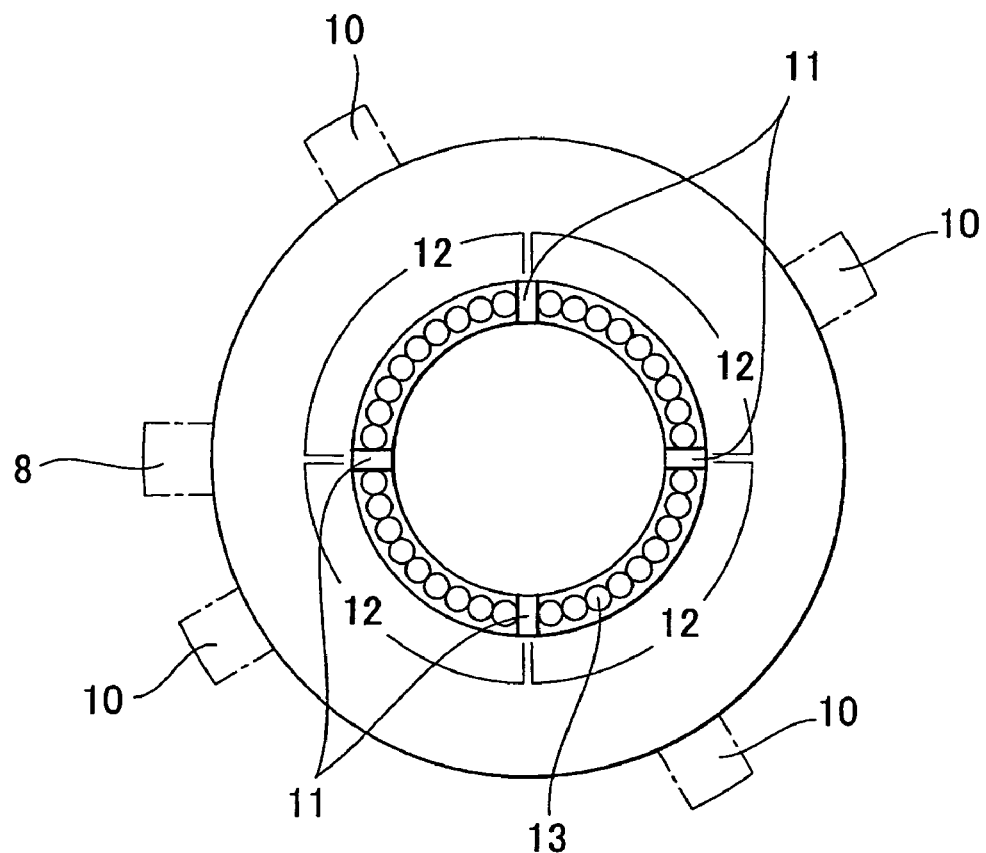
FIG. 2 is a schematic view taken along line II-II in FIG. 1.
Figure 3:
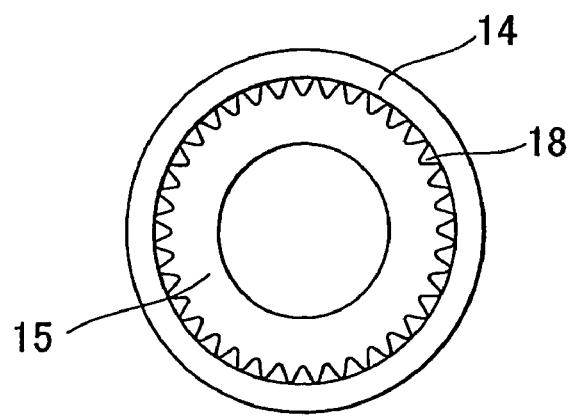
FIG. 3 is a schematic view taken along line III-III in FIG. 1.
Figure 4:
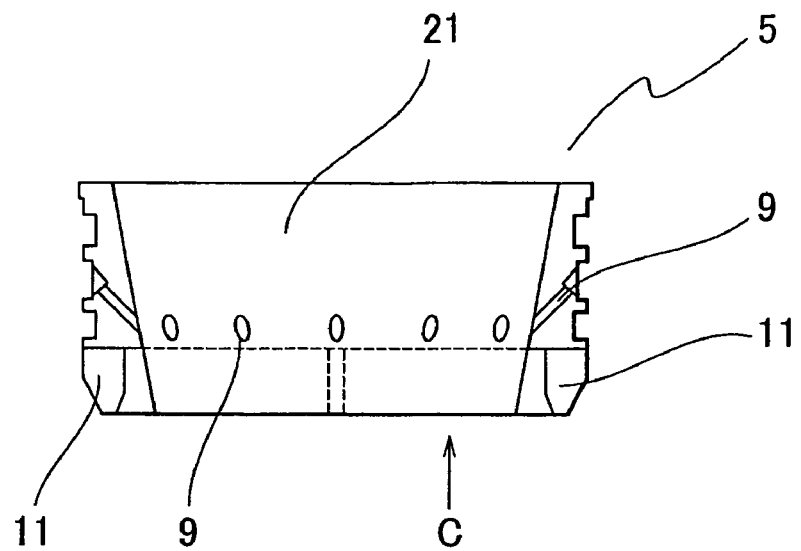
FIG. 4 is a view schematically showing a cross section of an inner side member 5 of a body portion 2.
Figure 5:
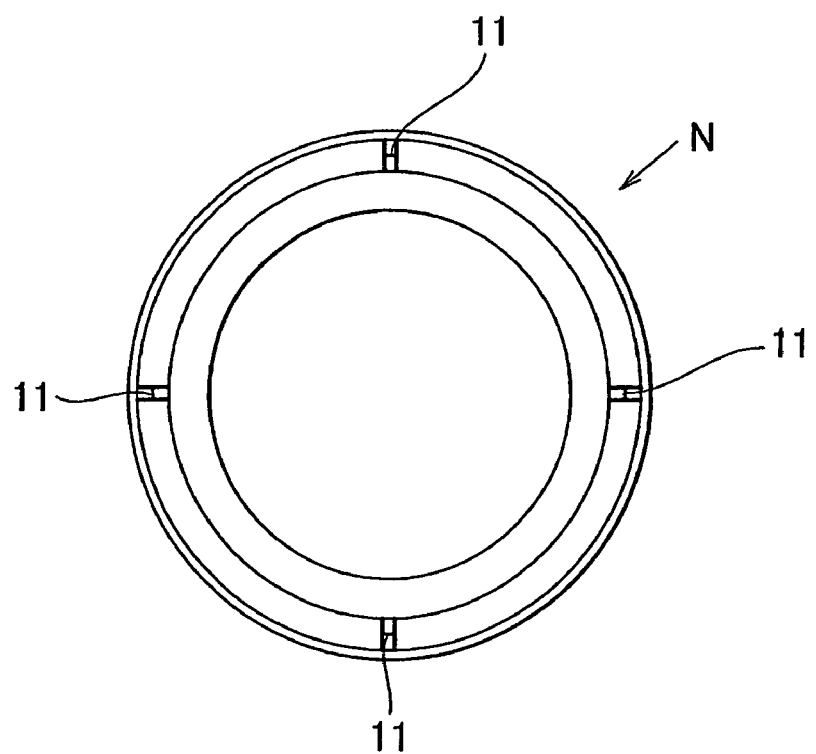
FIG. 5 is a front view schematically showing the inner side member 5 of the body portion 2 viewed from a direction of C.
Figure 6:
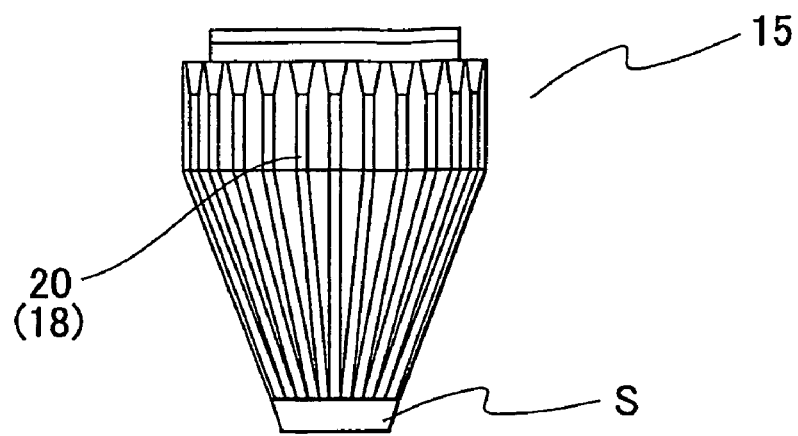
FIG. 6 is a side view schematically showing an example of an inner side nozzle member.

Hereafter, an embodiment of the invention will be described with reference to FIGS. 1 to 6. FIG. 1 is a cross sectional view schematically showing an entire structure of a powder metal cladding nozzle. FIG. 2 is a cross sectional view taken along line II-II in FIG. 1. FIG. 3 is a cross sectional view taken along line III-III in FIG. 1. Each of FIGS. 4 and 5 shows an inner side member of a nozzle body portion. FIG. 4 is a cross sectional view of the inner side member and FIG. 5 is a front view of the inner side member viewed from the direction of C. FIG. 6 is a side view of an inner side nozzle member of a nozzle portion.

A powder metal cladding nozzle 1 includes a cylindrical body portion 2, and a nozzle portion 3 which is coaxially coupled to the body portion 2.

The body portion 2 includes an outer side member 4 and an inner side member 5 which is fitted in a center space of the outer side member 4. A ring-shaped gas holding space 6, in which inert gas is held, and a powder metal holding space 7, in which powder metal is held along with carrier gas, are formed between the outer side member 4 and the inner side member 5.

A gas supply passage 8 formed by boring the outer side member 4 and plural gas discharge passages 9 formed by boring an inner wall of the inner side member 5 open into the gas holding space 6. The gas supply passage 8 and the gas discharge passages 9 are communicated with each other through the gas holding space 6.

Plural supply passages 10 for supplying powder metal open into the powder metal holding space 7. The powder metal holding space 7 is divided into plural powder metal holding regions 12, which correspond to the plural supply passages 10, by dividing portions 11.

From the periphery of a bottom portion defining the powder metal holding space 7, plural guiding holes 13, which guide the powder metal to the nozzle portion, extend in the direction parallel to an axis H. The guiding holes 13 are formed so as to open at a bottom surface of the outer side member 4.

The nozzle portion 3 includes an outer side nozzle member 14 coupled to the body portion 2; and an inner side nozzle member 15 fitted in the outer side nozzle member 14. The nozzle portion 3 is screwed into the body portion 2 with a coupling member 17. Between the outer side nozzle member 14 and the inner side nozzle member 15, plural powder metal discharge passages 18, which are communicated with the guiding holes 13 formed in the body portion 2, are formed so as to open at an outlet 19 of the nozzle portion 3. The discharge passages 18 may be groove portions which are formed in an inner surface of the outer side nozzle member 14, groove portions which are formed in an outer surface of the inner side nozzle member 15, or groove portions which are formed in both the inner surface of the outer side nozzle member 14 and the outer surface of the inner side nozzle member 15. FIG. 6 shows an example of the inner side nozzle member 15 in which groove portions 20 are formed in the outer surface thereof. The groove portions 20 may be formed such that a smooth portion S remains at an end portion of the inner side nozzle member 15. Also, a laser passage 21, which is communicated with the center space of the inner side member 5 of the body portion 2 and through which a laser L passes, is formed inside the inner side nozzle portion 15 (refer to FIG. 4). The laser passage 21 opens at the end of the inner side nozzle member 15, and this opening portion is an irradiation outlet 22. The laser passage 21 also serves as a passage through which inert gas such as nitrogen gas discharged from the gas discharge passages 9 passes. The inert gas is injected from the irradiation outlet 22 to the process portion W. A seal member 50 shown in FIG. 1 is an O-ring or the like, and used for maintaining gas tightness of the gas holding space 6, the powder metal holding space 7, and the like, which are formed between the outer side member 4 and the inner side member 5 of the body portion 2. The seal member 50 is also provided at an appropriate position in the surface where the body portion 2 contacts the nozzle portion 3.

The thus formed powder metal cladding nozzle 1 is coupled to laser beam generating means of a laser processing head, and further the powder metal supply passages 10 of the body portion 2 are connected to a powder metal supply source (hereinafter, referred to as a "feeder") through a powder metal supply pipe (not shown), whereby the following effects can be obtained.

The laser beam L, which is irradiated from the laser beam generating means connected to the upper portion of the body portion 2 of the powder metal cladding nozzle 1, passes through the laser passage 21 and is irradiated from the irradiation outlet 22 to the process portion W.

Meanwhile, powder metal P, which is supplied along with the carrier gas from the feeder to the powder metal supply passages 10 through the powder metal supply pipe, is equally supplied to the powder metal holding regions 12 which are obtained by dividing the powder metal holding space 7 using the dividing portions 11. The powder metal P supplied to the powder metal holding regions 12 passes through the guiding holes 13 and the discharge passages 18, and is discharged from the outlet 19 to the process portion W and a peripheral area thereof. The discharged powder metal P is dissolved by the laser beam L and forms a cladding layer on the process portion W.

In the powder metal cladding nozzle 1 according to the embodiment, the powder metal holding space 7 formed in the body portion 2 is divided into plural powder metal holding regions by the dividing portions 11 such that the diving regions correspond to the supply passages 10. Therefore, the powder metal P can be discharged uniformly from the ranges of the ring-shaped outlet 19, which correspond to the powder metal holding regions.

As mentioned above, the powder metal P is supplied along with the carrier gas from the supply passages 10 to the corresponding powder metal holding regions. Therefore, the discharge state of the powder metal P from the outlet 19 varies depending on the direction in which the powder metal P is supplied to the powder metal holding regions 12, that is, the arrangement of the supply passages 10 corresponding to the powder metal holding regions 12. Here, a description will be made concerning the case where the powder metal P is supplied from the four supply passages 10 to the powder metal holding regions 12, which are obtained by dividing the powder metal holding space 7 into four regions by the dividing portions 11.

Figure 7:
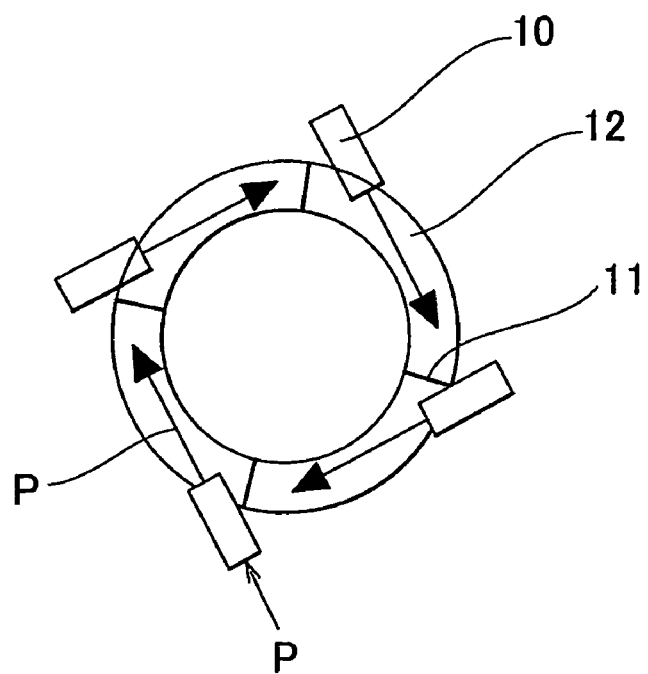
FIG. 7 is a conceptual view showing a first example.
Figure 8:
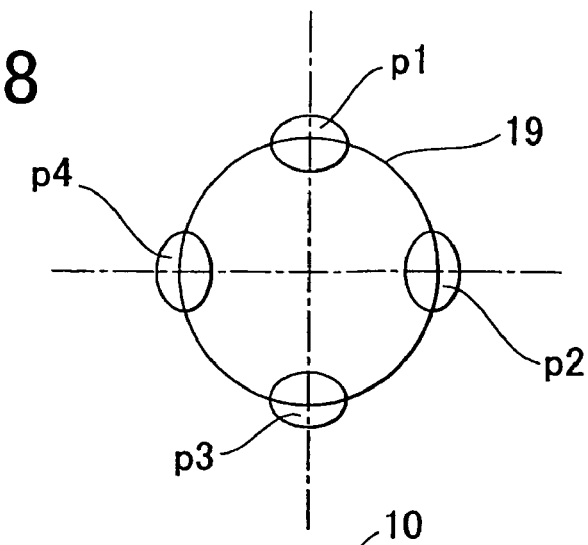
FIG. 8 is a conceptual view showing a discharge state of powder metal from an outlet 19 in the first example.

FIG. 7 is a conceptual view showing a first example. In the first example, the powder metal P is supplied to the arc-shaped powder metal holding region 12 in the tangential direction thereof. Each of the supply passages 10 is formed in an end portion of the corresponding powder metal holding region 12, and opens in the tangential direction of the arc. FIG. 8 is a conceptual view showing a discharge state of the powder metal P viewed from the process portion W when the nozzle according to the first example is used. The powder metal P is discharged in a concentrated manner from portions p1 to p4, which correspond to the dividing portions 11, such that the amounts of powder metal P discharged from the portions p1 to p4 are uniform.

Figure 9:
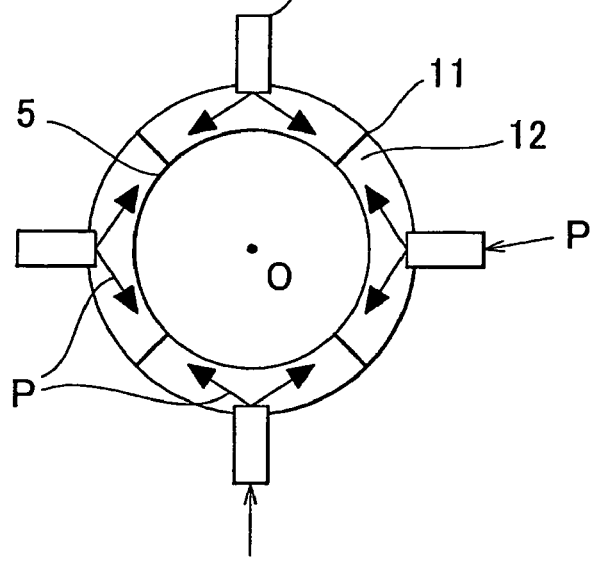
FIG. 9 is a conceptual view showing a second example.
Figure 10:
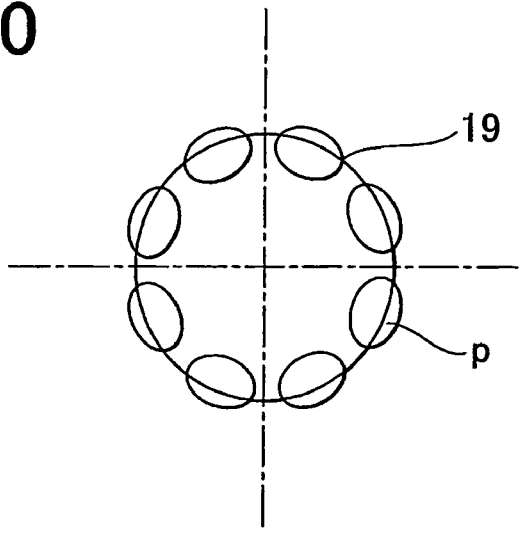
FIG. 10 is a conceptual view showing a discharge state of powder metal from the outlet 19 in the second example.

FIG. 9 is a conceptual view showing a second example. In the second example, the powder metal P is supplied from a position, which divides the arc of each powder metal holding region 12 in half, toward a center O of the arc. By supplying the powder metal P along with the carrier gas toward the center O of the arc, the powder metal P is dispersed from side to side along a wall surface of the inner side member 5 of the powder metal holding region 12. Accordingly, the powder metal P is supplied to the powder metal holding region 12 while the dispersibility of the powder metal P is higher than that in the first example. Therefore, the powder metal P is discharged from the outlet 19 such that an amount of powder metal P discharged from the outlet 19 is further uniform at any portion of the outlet 19. FIG. 10 is a conceptual view showing a discharge state of the powder metal P viewed from the process portion W when the nozzle according to the second example is used. The powder metal P is discharged from the outlet 19, as shown by ellipses p. Therefore, the powder metal P is discharged such that an amount of powder metal P discharged from the outlet 19 is further uniform at any portion of the outlet 19, as compared to the first example.

Figure 11:
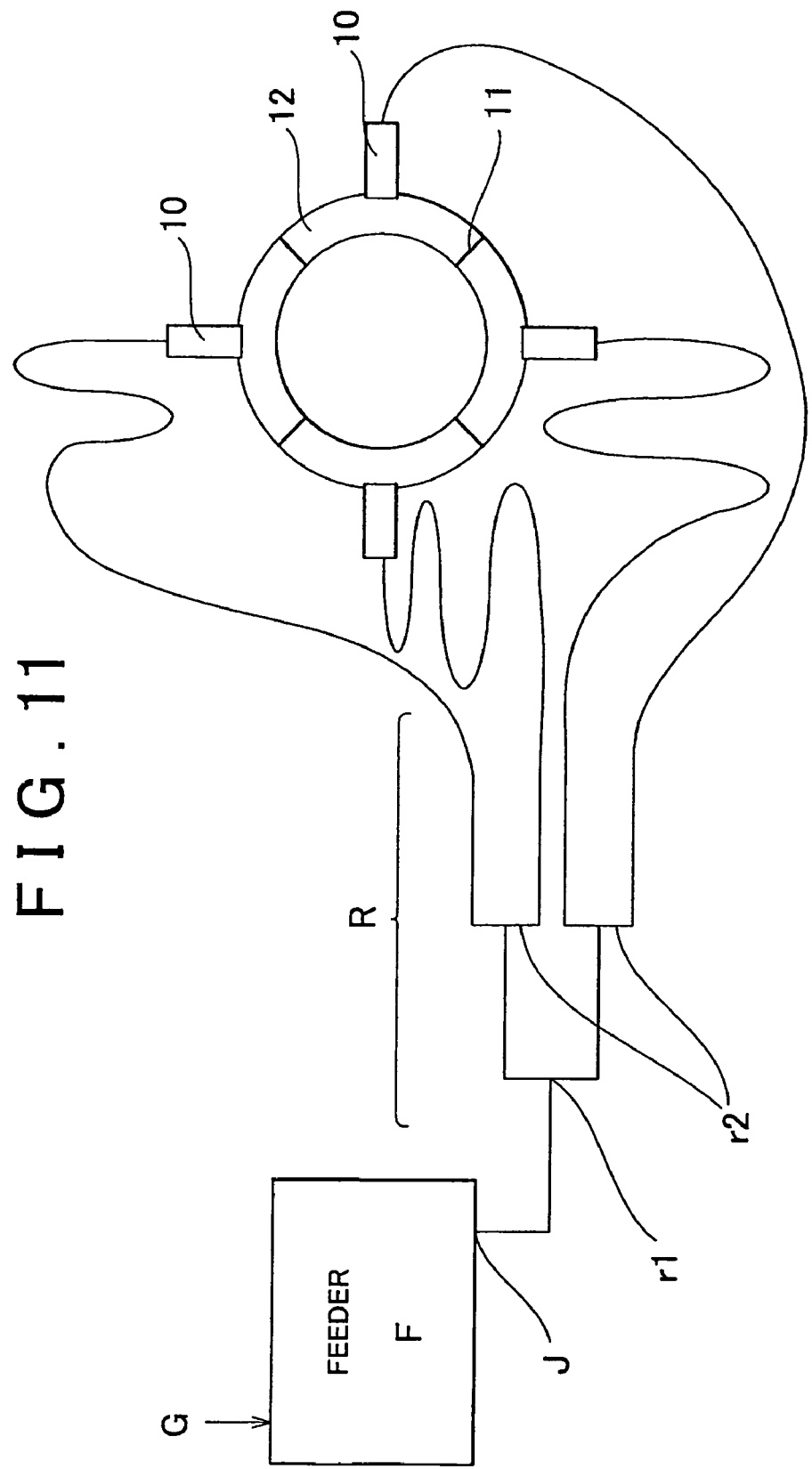
FIG. 11 is a conceptual view showing a powder metal supply system passage R in the second example.

In order to simultaneously discharge the powder metal P from portions p of the outlet 19, it is preferable that the distances from the powder metal supply source (hereinafter, referred to as the "feeder") which supplies the powder metal P to the supply passages 10 be equal to each other, as shown in FIG. 11. FIG. 11 is a conceptual view showing a supply route of the powder metal P. The powder metal P supplied from a feeder F by carrier gas G is supplied to the powder metal holding regions 12 through the supply passages 10 while sequentially being equally divided by branching means r1, and r2 such as a cheese provided in a supply route R. At this time, the distances from an outlet J of the feeder F to the supply passages 10 are made equal to each other. By making the distances of the supply routes of the powder metal P from the outlet J of the feeder F to the supply passages 10 equal to each other, the powder metal P is simultaneously discharged from the powder metal holding regions 12 to the process portion W. It is therefore possible to stably perform cladding processing.

Figure 12:
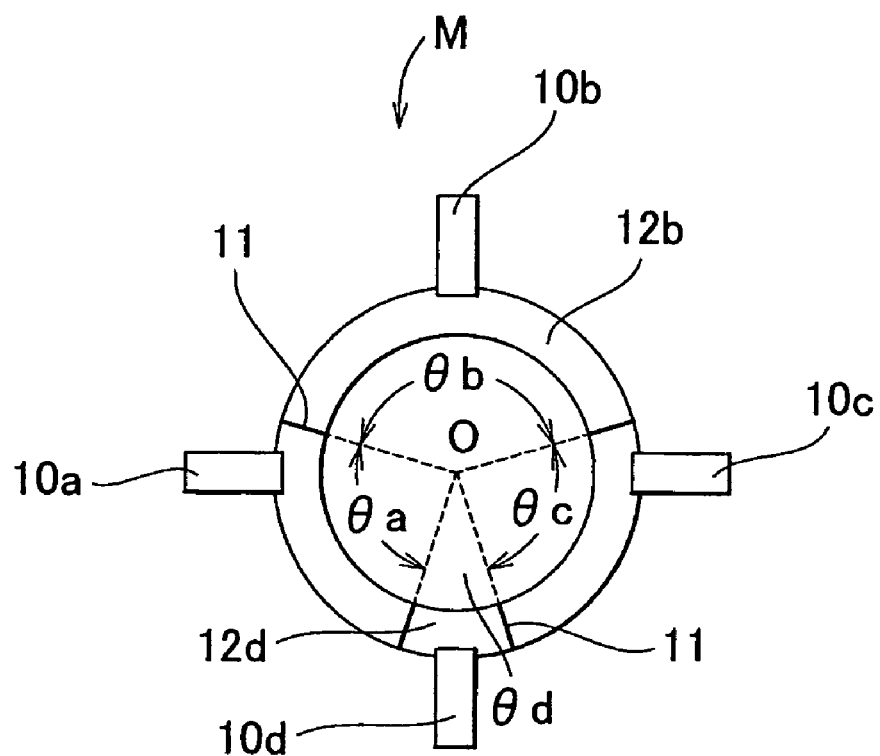
FIG. 12 is a conceptual view showing a third example.

According to a third example, the sizes of the powder metal holding regions 12 are made different, and the powder metal P is supplied toward the center O of the arc. In each of the first and the second examples, the powder metal holding space 7 is equally divided by the dividing portions 11 and the sizes of the powder metal holding regions 12 are made equal to each other. However, the sizes of the powder metal holding regions 12 may be made different depending on the position of the powder material holding region 12 when the nozzle 1 is tilted with respect to the vertical direction. FIG. 12 is a conceptual view showing an example of the third example.

FIG. 12 shows the case where the cladding processing is performed while the powder metal cladding nozzle 1 is tilted such that the supply passages 10a and 10c extend in the horizontal direction, the supply passage 10b extends upward, and the supply passage 10d extends downward. In this case, the dividing portions 11 of the inner side member 5 of the body 2 are formed such that the size of a powder metal holding region 12b corresponding to the supply passage 10b extending upward is made large, and the size of a powder metal holding region 12d corresponding to the supply passage 10d extending downward is made small.

By making the sizes of the powder metal holding regions different, the flow rates of the powder metal P discharged from the outlet can be made different depending on the portions of the outlet, even when the flow rates of the powder metal P supplied to the powder metal holding regions are equal to each other. It is therefore possible to control the shape of the cladding layer formed on the process portion so as to obtain an intended shape.

Figure 13:
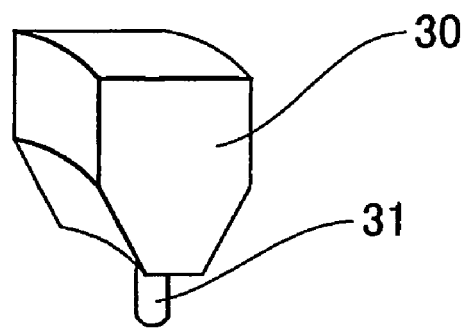
FIG. 13 is a perspective view showing an example of a dividing member.

In the example, in order to easily change the sizes of the powder metal holding regions 12 to intended sizes, it is preferable that each of the dividing portions 11 of the inner side member 5 be dividing member 30 which is attachable to/detachable from the inner side member 5. FIG. 13 is a perspective view showing an example of the dividing member 30 which is attachable to/detachable from the inner side member 5. The dividing members 30 can divide the powder metal holding space 7 into the powder metal holding regions 12 having intended sizes, when pins 31, each of which is provided at a bottom portion of the dividing member 30, are inserted in desired guiding holes 13 from among plural guiding holes 13 which open into the powder metal holding space 7.

Hereafter, the embodiment will be described in more detail with reference to test examples.

(1) A test example 1 will be described. In the test example 1, three types of powder metal cladding nozzles were used each of which is formed by combining the outer side nozzle member and one of the three inner side nozzle members having different sizes in the nozzle portion. A degree of concentration of the powder metal in the process portion and yield of the powder metal when a cladding layer was formed (hereinafter, referred to as "powder efficiency") were obtained concerning each of the three types of powder metal cladding nozzles. In this test, the powder metal holding space of the body portion, which was equally divided into four regions, was used as in the first example shown in FIG. 7. Also, the inner side nozzle member (shown in FIG. 6), which was fitted in the outer side nozzle member and which had the groove portions 20 forming the discharge passage 18, was used.

The degree of concentration of the powder metal changes according to a vertical distance from the end of the nozzle, which discharges the powder metal, to the process portion (hereinafter, referred to as a "discharge distance"). Generally, as the discharge distance becomes shorter, the degree of concentration of the powder metal becomes higher. However, when the discharge distance is short, the end of the nozzle is likely to be affected by radiation heat, a spatter and the like from the process portion due to formation of the cladding layer. It is therefore necessary to maintain a certain degree of discharge distance. In the test example 1, three types of powder metal cladding nozzles X, Y and Z were used. The powder metal cladding nozzle X was prepared by combining the inner side nozzle member having a discharge distance of 15 mm and the outer side nozzle member having a discharge distance of 15 mm. The powder metal cladding nozzle Y was prepared by combining the inner side nozzle member having a discharge distance of 20 mm and the outer side nozzle member having a discharge distance of 15 mm. The powder metal cladding nozzle Z was prepared by combining the inner side nozzle member having a discharge distance of 25 mm and the outer side nozzle member having a discharge distance of 15 mm. The inner side nozzle member of the powder metal cladding nozzle X had the smooth portion S in which the groove portions were not formed in a range of 5 mm from the end thereof.

(1-1) The degree of concentration of the powder metal will be described. The degree of concentration of the powder metal was measured in the state where the powder metal cladding nozzle was provided downward in the vertical direction and an aperture having a diameter of 5 mm was provided at a focus position of the powder metal. A weight percentage of a passage amount X2, which is an amount of the powder metal that passed through the aperture, with respect to a supply amount X1 of the powder metal (X2/X1×100) was used as the degree of concentration of the powder metal. The distance from the end of the nozzle to the aperture (discharge distance) was 15 mm.

The powder metal (CuLS50) was supplied to the thus provided powder metal cladding nozzle in the condition in which a flow rate of the carrier gas (nitrogen has) was 14 L/min and a supply speed of the powder metal was 0.9 g/min, and the degree of concentration of the powder metal discharged from the powder metal cladding nozzle was measured. Table 1 shows the result of this measurement. In table 1, the degree of concentration of the powder metal is shown by a relative value using the measurement value, which was obtained when the powder metal cladding nozzle X was used, as "1".

Namely, the degree of concentration of the powder metal was "1" when the powder metal cladding nozzle X (the discharge distance of the inner side nozzle member was 15 mm) was used; "0.98" when the powder metal cladding nozzle Y (the discharge distance of the inner side nozzle member was 20 mm) was used; and "0.93" when the powder metal cladding nozzle Z (the discharge distance of the inner side nozzle member was 25 mm) was used. Therefore, it was found that as the difference in the discharge distance between the outer side nozzle member and the inner side nozzle member was smaller, the degree of concentration of the powder metal was higher.

TABLE 1

| Types of nozzle | Degree of concentration | Powder efficiency Clockwise | Counterclockwise |
|---|---|---|---|
| X | 1 | 0.89 | 0.86 |
| Y | 0.98 | 0.96 | 1 |
| Z | 0.93 | 0.86 | 0.94 |

(1-2) The powder efficiency will be described. First, a laser cladding processing device used in this test will be briefly described.

Figure 17:
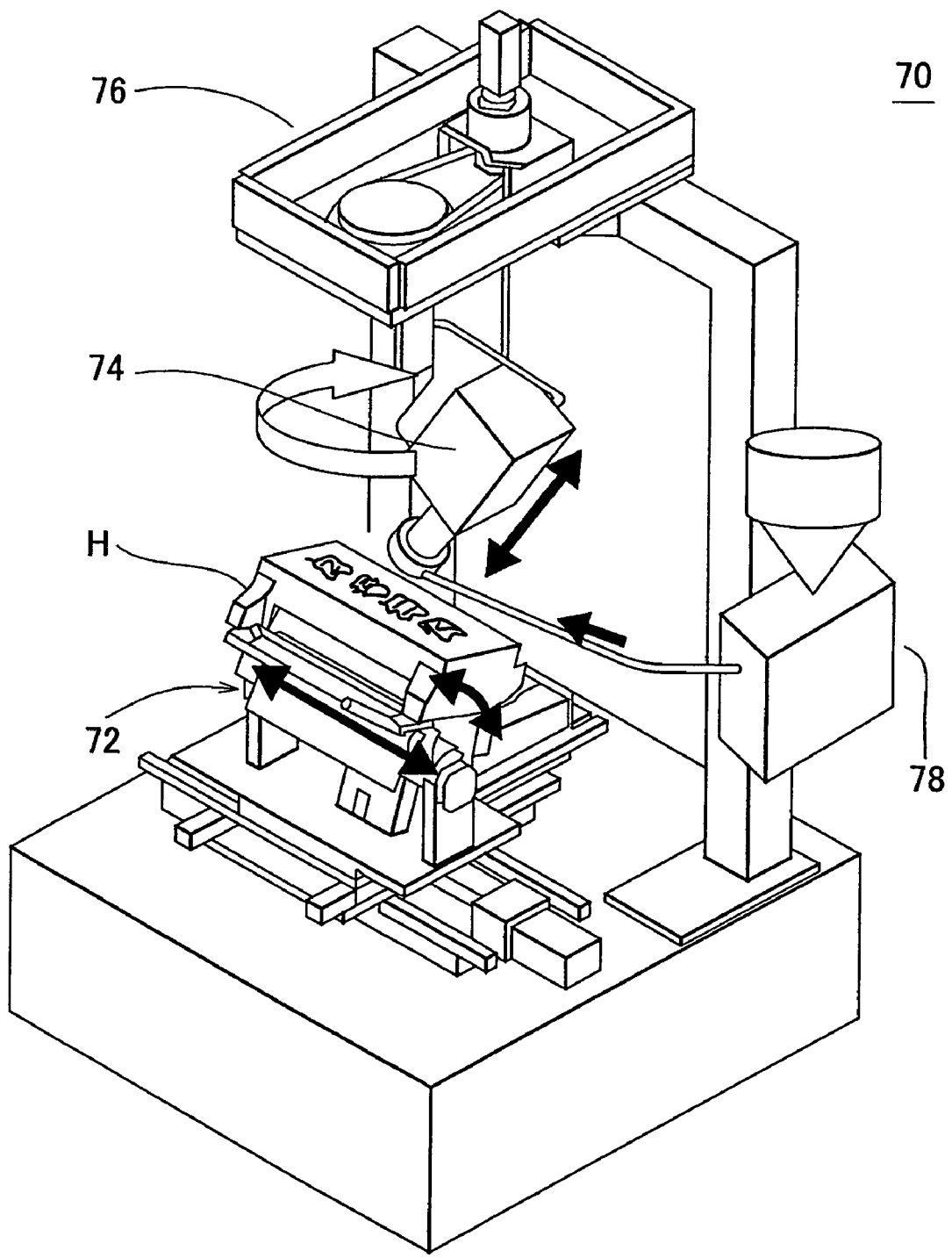
FIG. 17 is a perspective view showing an entire structure of a laser cladding processing device used in a test example.

FIG. 17 is a perspective view showing an entire structure of a laser cladding processing device 70. The laser cladding processing device 70 is a laser cladding processing device which performs laser cladding processing on a valve seat portion of a cylinder head H. The laser cladding processing device 70 includes cylinder head holding means 72 for tiltably holding the cylinder head H; a laser processing head 74 which irradiate the process portion with a laser beam and which discharges the powder metal; rotating means 76 for holding the laser processing head 74 so as to be tilted with respect to the vertical direction and for rotating the laser head processing head 74 around the vertical line; and powder metal supplying means 78 for supplying the powder metal to the laser processing head 74.

Figure 18:
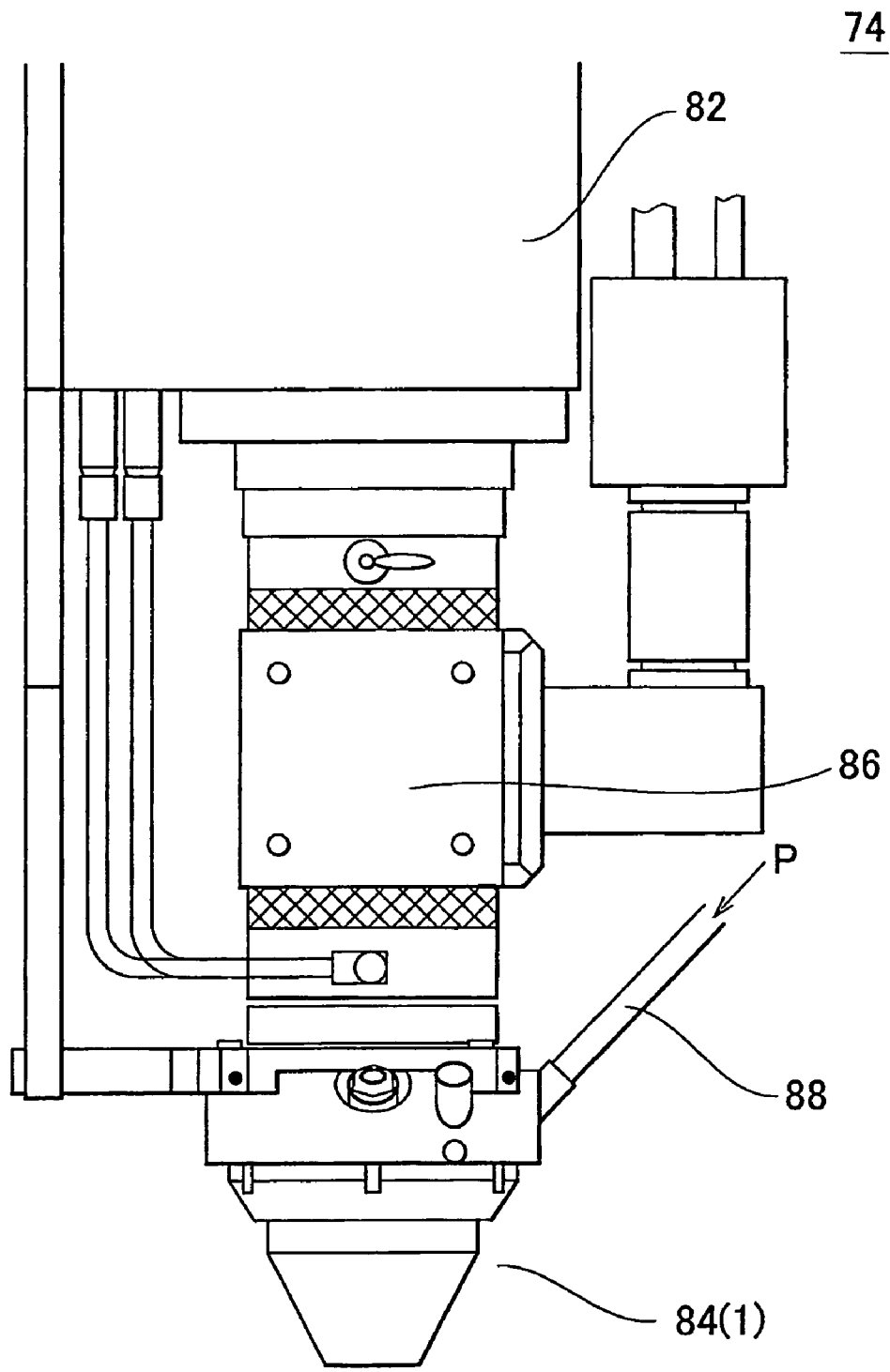
FIG. 18 is a view schematically showing a structure of a laser processing head in FIG. 17.
Figure 19:
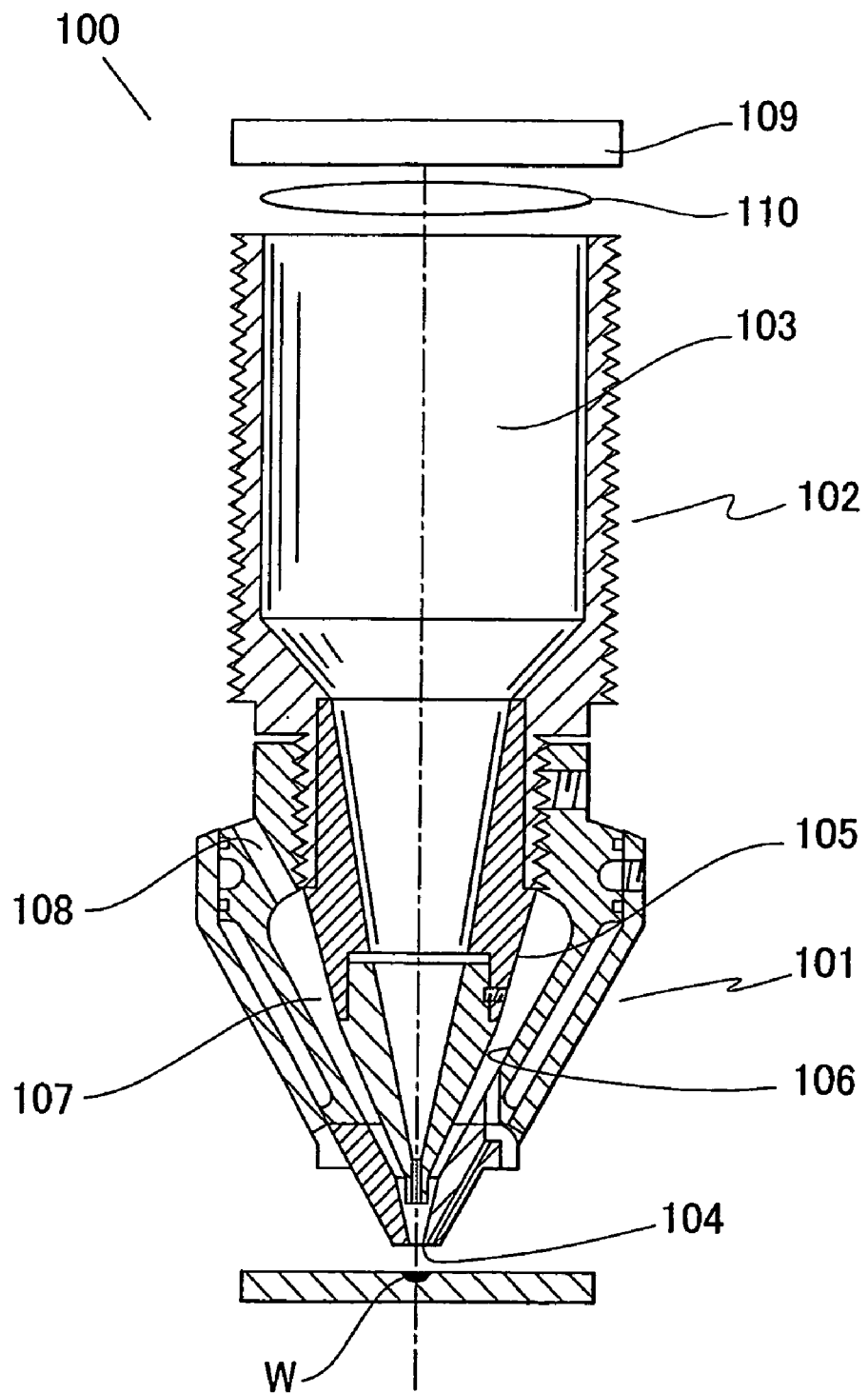
FIG. 19 is a cross sectional view schematically showing a powder metal cladding nozzle according to related art.

Next, a structure of the laser processing head 74 of the laser cladding processing device 70 is schematically shown in FIG. 18. FIG. 18 is a front view schematically showing the laser processing head 74. The laser processing head 74 includes laser beam generating means 82 for generating a laser beam; and a powder metal cladding nozzle 84 through which the generated laser beam passes and which discharges the powder metal. The laser beam generating means 82 is integrally connected to the powder metal cladding nozzle 84 via an optical system portion 86 which converges the laser beam. A supply hose 88 for supplying the powder metal P is connected to the powder metal cladding nozzle 84, and the supply hose 88 is connected to the powder metal supplying means 78.

As the powder metal cladding nozzle 84 of the thus formed laser processing head 74, each of the above-mentioned powder metal cladding nozzles X, Y, and Z was attached to the laser processing head 74, and a cladding layer was formed on a valve seat test piece, whereby the powder efficiency of each of the powder metal cladding nozzles X, Y and Z was checked.

In this test, the powder efficiency was obtained as a percentage of a difference between a weight W1 of the valve seat test piece before cladding and a weight W2 of the valve seat test piece after cladding with respect of a supply weight W of the powder metal ((W2−W1)/W×100).

Since the powder efficiency varies depending on the rotational direction of the laser processing head, the powder efficiency was obtained in each of the clockwise rotational direction and the counterclockwise rotational direction with respect to the process portion. The cladding was performed under the condition in which a laser output was 2.6 kw, a processing speed was 0.9 m/min, a flow rate of the carrier gas (nitrogen gas) was 14 L/min, a flow rate of the center gas was 6 L/min, a supply speed of the powder metal was 0.9 g/sec, and a type of the powder metal was CuLS70 (#52). In this case, the tilt angle of the laser processing head was 35° with respect to the downward vertical direction. The result is shown in table 1. In table 1, the powder efficiency is shown as a relative value using the powder efficiency in the counterclockwise direction when the powder metal cladding nozzle Y was used, with which the highest value was obtained, as "1".

When the powder metal cladding nozzle X (the discharge distance of the inner side nozzle member was 15 mm) was used, although the difference in the powder efficiency between the rotational directions was small, the powder efficiency was low. When the powder metal cladding nozzle Y (the discharge distance of the inner side nozzle member was 20 mm) was used, although there was a difference of 0.04 in the powder efficiency between the rotational directions, high powder efficiency of 0.96 or higher was obtained in each of the rotational directions. When the powder metal cladding nozzle Z (the discharge distance of the inner side nozzle member was 25 mm) was used, there was a big difference of 0.08 in the powder efficiency between the rotational directions, and the powder efficiency was lower than that when the powder metal cladding nozzle Y was used.

In the above-mentioned measurement, the degree of concentration, which was obtained when the powder metal cladding nozzle X was used, was higher than the degree of concentration, which was obtained when the powder metal cladding nozzle Y was used. However, the powder efficiency, which was obtained when the powder metal cladding nozzle Y was used, was higher than the powder efficiency, which was obtained when the powder metal cladding nozzle X was used. Generally, it is considered that the degree of concentration and the powder efficiency of the powder metal are in a proportional relationship. It is estimated that the above-mentioned result that the degree of concentration and the powder efficiency of the powder metal were not in a proportional relationship was caused due to the difference in the structure of the end portion among the nozzle portions.

Figure 14:
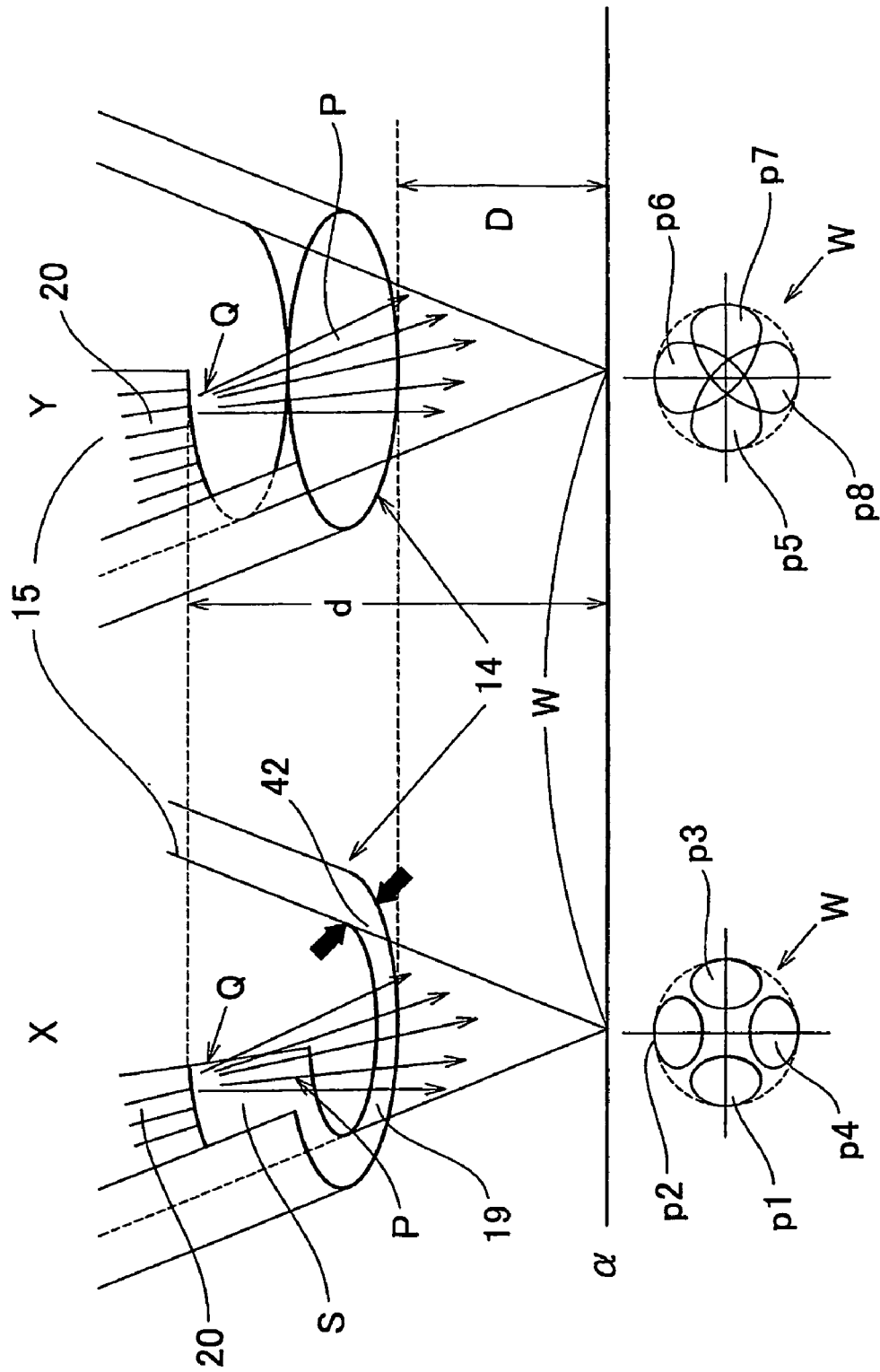
FIG. 14 is a view showing a relationship between a shape of an end of the powder metal cladding nozzle, and a degree of concentration of the powder metal and powder efficiency.

FIG. 14 shows enlarged shapes of the end portions of the powder metal cladding nozzle X and the powder metal cladding nozzle Y In FIG. 14, conceptual views of the end portions of the nozzles are shown on the upper side with respect to a cladding process surface α, and front views obtained by estimating the concentration states of the powder metal P discharged to the process portion W are shown on the lower side with respect to the cladding process surface α. A circle W shown by the dashed line is the range of the process portion. In the test, the circle W has a diameter of 5 mm. Each of the regions p1 to p8 shown by the solid lines is the range in which the powder metal from the corresponding powder metal holding region is discharged in a concentrated manner.

Concerning the powder metal cladding nozzle X (left side view in FIG. 14), each of the discharge distance D from the end of outer side nozzle member 14 to the process portion and the discharge distance D from the end of the inner side nozzle member 15 to the process portion is 15 mm. However, the inner side nozzle member 15 has the smooth portion S, in which the groove portions 20 are not formed, in the area of 5 mm from the end thereof Meanwhile, concerning the powder metal cladding nozzle Y (right side view in FIG. 14), although the discharge distance from the end of the inner side nozzle member 15 to the process portion is 20 mm, the groove portions 20 are formed to the end of the inner side nozzle member 15. Accordingly, the distance D from an end Q of the groove portions 20 of each of the powder metal cladding nozzles X and Y to the process portion W is 20 mm.

When the powder metal cladding nozzle X is used, the powder metal P guided to the point Q is further guided by the smooth portion S where the groove portions 20 are not formed, and is discharged from the outlet 19 to the process portion W. As a result, it is considered that the powder metal P is discharged in a concentrated manner to the regions p1 to p4, which are formed so as not to overlap with each other, in the process portion W.

Meanwhile, when the powder metal cladding nozzle Y is used, the end of the inner side nozzle member 15 is retracted with respect to the end of the outer side nozzle member 14 by 5 mm in the axial direction. Therefore, the powder metal P discharged from the point Q of the groove portions 20 is dispersed and discharged to regions p5 to p8 which partially overlap with each other in the process portion W. Accordingly, it is estimated that the powder metal P is easily taken in a molten metal pool during the cladding processing, and high powder efficiency is obtained.

Namely, by making the end of the inner side nozzle member retracted with respect to the end of the outer side nozzle member by a predetermined amount in the axial direction, the powder efficiency can be increased.

(2) Hereafter, a test example 2 will be described. The powder metal cladding nozzle, which was held so as to be tilted with respect to the vertical direction, was used. A cladding layer was formed on a valve seat test piece by using a powder metal cladding nozzle M. In the powder metal cladding nozzle M, the powder metal holding space in the body portion was divided such that the size of the upper powder metal holding region was made large and the size of the lower powder metal holding region was made small, as shown in FIG. 12. Also, for comparison, a cladding layer was formed using a powder metal cladding nozzle N in which the powder metal holding space was equally divided into four regions. Then, the shapes of the cross sections of the obtained cladding layers were compared to each other. Note that, the laser cladding processing device shown in FIGS. 17 and 18 was used for forming a cladding layer on the valve seat test piece, as in the test example 1.

As shown in FIG. 12, in the powder metal cladding nozzle M, the powder metal holding space was divided such that the size of the upper powder metal holding region 12b was made large (the angle between lines connecting the dividing portions 11 to the axis O: θb=150°), the size of the lower powder metal holding region 12d was made small (the angle between lines connecting the dividing portions 11 to the axis O:θd=30°), and the sizes of the powder metal holding regions 12a and 12c arranged in the horizontal direction were made equal to each other (the angle between lines connecting the dividing portions 11 to the axis O: θa=9°, θc=90°), and the nozzle portion was formed by employing the same combination of the inner side and the outer side nozzle members as the powder metal cladding nozzle Y used in the test example 1. In the powder metal cladding nozzle N used for comparison, the powder metal holding space was divided into four regions (the angle between lines connecting the dividing portions 11 to the axis O: θ=90), and the nozzle portion was formed by employing the same combination of the inner side and the outer side nozzle members as the powder metal cladding nozzle Y used in the test example 1.

Each of the thus formed powder metal cladding nozzles M and N was attached to the laser processing head 74 shown in FIG. 18, and the laser cladding processing was performed on the groove portion (outer diameter: 33 mm, inner diameter: 21 mm) for the valve seat of the cylinder head.

The main specifications of the laser cladding processing device were as follows; a laser was a semiconductor laser of 3 kw, a tilt angle of the laser processing head was 35 degrees with respect to the vertical direction, the laser processing head was rotatable 420 degrees in normal rotational direction and reverse rotational direction (overlap amount was 60 degrees), and laser processing time was 7 seconds. Also, the main cladding processing conditions were as follows; a processing speed was 0.9 m/min, a laser output was 2.6 kw, a supply speed of the powder metal was 0.9 g/sec, the type of the powder metal was CuLS50 (copper powder), a flow rate of the carrier gas (nitrogen gas) was 10 L/min, and a flow rate of the center gas was 6 L/min.

The observation results of the cross sections of the cladding layers are shown in FIGS. 15 and 16. FIG. 15 shows the result of the test example 2 using the powder metal cladding nozzle M, and FIG. 16 shows the result of the comparative example using the powder metal cladding nozzle N.

Each of FIGS. 15 and 16 shows a formed cladding layer c, a surface f (dashed line) of the test piece before cladding processing is performed on the process portion W, and a processed surface s (chain line) which is obtained by finish machining the formed cladding layer into a product shape.

As shown in FIG. 16, the cladding layer c formed by the powder metal cladding nozzle N had a shape whose lower portion d was drooping. Accordingly, in an upper portion b of the cladding layer c, the process margin for the process surface s could not be obtained, and an unmachined surface may remain after processing. As a result, it was found that the quality of the valve seat was reduced. Also, in this case, the amount of molten aluminum base metal was increased near the upper portion b, and the aluminum dilution concentration of the cladding layer was equal to or higher than 1 weight percent, which is a high value.

Meanwhile, in the test example 2 shown in FIG. 15, the cladding layer c was formed substantially parallel to the processed surface s. Accordingly, the unmachined surface was entirely removed by the finish machining. Therefore, it was found that the good valve seat could be obtained. Note that, the aluminum dilution concentration of the cladding layer formed in the test example 2 was equal to or lower than 0.5 weight percent.

It was found that the flow rate of the powder metal was increased and drooping of the cladding layer could be prevented by making the size of the lower powder metal holding region smaller than the size of the upper powder metal holding region in the body portion 2 of the powder metal cladding nozzle, as in the test example 2, when the cladding processing was performed while the powder metal cladding nozzle was tilted with respect to the vertical.

The powder metal cladding nozzle according to the embodiment is attached to the laser processing head of the laser cladding processing device, and can be appropriately used for forming a valve seat of a cylinder head and coating of a bore.

The invention claimed is:

1. A powder metal cladding nozzle which is coaxially attached to a laser processing head that irradiates a process portion with a laser beam and that discharges powder metal to a laser beam irradiation portion in the process portion, comprising a body portion that has a ring-shaped powder metal holding space in which the powder metal is held; and a nozzle portion that is connected to the body portion and that has plural discharge passages which are communicated with the powder metal holding space and which open at an outlet for discharging the powder metal, wherein:

the powder metal holding space is within the body portion and is divided into plural powder metal holding regions corresponding to plural supply passages that open into the powder metal holding space and that supply the powder metal to the powder metal holding space, and the body portion includes a dividing portion that divides the powder metal holding space into the plural powder metal holding regions.

2. The powder metal cladding nozzle according to claim 1, wherein the body portion includes an outer side member and an inner side member which is within the outer side member, the powder metal holding space comprises surfaces of the inner side member and the outer side member, and the inner side member includes the dividing portion for dividing the powder metal holding space into the plural powder metal holding regions.

3. The powder metal cladding nozzle according to claim 2, wherein the inner side member includes the dividing portion and an inner side body portion, and the dividing portion is attachable to/detachable from the inner side body portion.

4. The powder metal cladding nozzle according to claim 2, wherein the dividing portion includes plural dividing members, and widths of the powder metal holding regions are adjustable by adjusting distances between the adjacent dividing members among the plural dividing members.

5. The powder metal cladding nozzle according to claim 1, wherein the nozzle portion includes an outer side nozzle member and an inner side nozzle member having plural groove portions in an outer surface, and the discharge passages comprise passages defined by the plural groove portions and a surface of the outer side nozzle member.

6. The powder metal cladding nozzle according to claim 5, wherein the inner side nozzle member is within the outer side nozzle member such that an end of the inner side nozzle member is recessed with respect to an end of the outer side nozzle member by a predetermined amount in an axial direction of the nozzle portion.

7. The powder metal cladding nozzle according to claim 1, wherein the supply passages are communicated to the powder metal holding regions at a central portion of an arc of each the powder metal holding regions such that the powder metal is supplied to the powder metal holding regions toward a center of the arc.

8. The powder metal cladding nozzle according to claim 1, wherein a supply passage of the plural supply passages is communicated to a powder metal holding region of the plural powder metal holding regions at a central portion of an arc of the powder metal holding region such that the powder metal is supplied to the powder metal holding region toward a center of the arc.

* * * * *